United States Patent

[11] 3,595,549

| [72] | Inventor | Erik Axel Sköld<br>Hallefors, Sweden |
|---|---|---|
| [21] | Appl. No | 797,871 |
| [22] | Filed | Feb. 10, 1969 |
| [45] | Patented | July 27, 1971 |
| [73] | Assignee | Aktiebolaget Svenska Kullaterfabriken<br>Goteborg, Sweden |
| [32] | Priority | Feb. 9, 1968 |
| [33] | | Sweden |
| [31] | | 1707/68 |

[54] SLAG LADLE
5 Claims, 3 Drawing Figs.

[52] U.S. Cl. .................................................. 266/37,
266/39, 266/34, 266/ DIG. 2
[51] Int. Cl. ...................................................... C21c 7/10
[50] Field of Search ............................................ 266/24, 34,
34 V, 37, 38, 39

[56] References Cited
UNITED STATES PATENTS

| 2,349,972 | 5/1944 | Lister | 266/37 |
| 3,246,889 | 4/1966 | Sieckman et al. | 266/43 |
| 3,360,254 | 12/1967 | Hellmund | 266/37 |

*Primary Examiner*—Gerald A. Dost
*Attorney*—Holman and Stern

ABSTRACT: A slag ladle for a metallurgical furnace is formed in such a manner that its lower end essentially covers the area of the furnace at the level where it is expected to cooperate therewith and is provided with a concave bottom and a centrally located inlet to the receptacle, which is kept under vacuum.

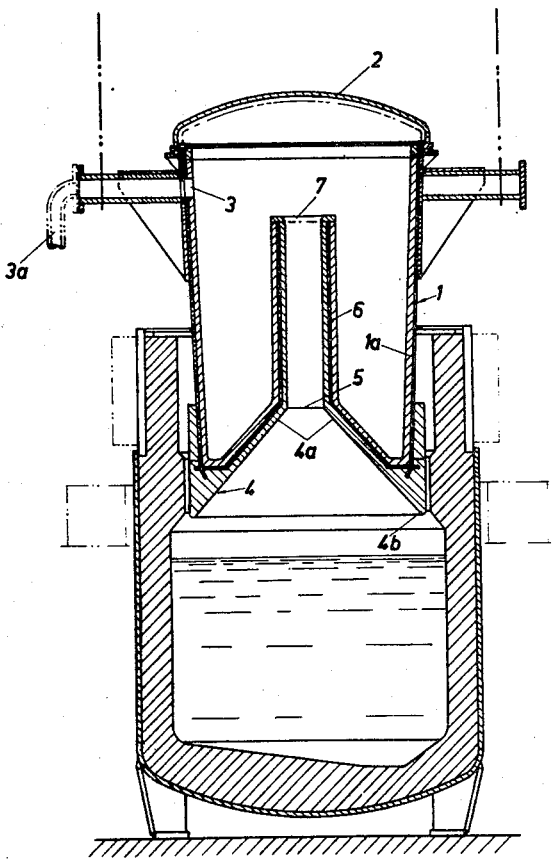

INVENTOR
ERIK AXEL SKÖLD
ATTORNEYS

SLAG LADLE

BACKGROUND OF THE INVENTION

The present invention refers to slag ladles of the type comprising a receptacle provided with a tightly fitting lid and a connection to a slag-sucking apparatus, as well as with a bottom having an essentially centrally located inlet.

In certain processes related to steel manufacture scrap iron and pig iron are melted in a blast furnace and in other processes pig iron is refined in a LD-converter. The melt is thereafter transferred to a ladle furnace, where the content of oxygen, hydrogen and sulfur is reduced. The slag covering the melted steel after the initial melting or refining has a high content of $P_2O_5$ and of FeO. It is highly important that this slag be removed completely before the final treatment of the melt contained takes place in the ladle.

In ordinary melting furnaces this slag is usually removed by means of a rake or skimmer. Various methods for sucking the slag away from the melt by means of vacuum, have been proposed. The removal of slag by means of a rake or by known vacuum methods is unsatisfactory as said means do not completely remove the slag from the surface of the steel bath. The remaining slag will increase the phosphorus content of the steel bath due to the reducing conditions prevailing within the ladle. The phosphoric acid in the refinery slag will be reduced to phosphorus, which is dissolved in the steel. The FeO-content of the remaining slag will make the sulfur removal from the steel bath more difficult and possibly prevent the same, and will also increase the slag attack on the ladle lining.

Slag removal by vacuum action is in known methods brought about by means of a slag ladle carried by an overhead crane in such a manner that the ladle may be lowered into the furnace.

The slag ladle is provided with an inlet designed as a pipe opening below the bottom of the ladle. When the vacuum pump is started and the pipe is lowered into the slag cover, slag is sucked up into the ladle. The sucking action works in the central portion of the ladle furnace, which means that the slag along the walls of the furnace will remain unaffected, as the furnace area is too large for the sucking action to reach the wall, of the furnace.

Due to the difficulties found in controlling the position of the slag ladle, and incidentally also in controlling the height of the pipe in relation to the steel surface, withdrawal of steel cannot be prevented. Such removal will of course mean an economic loss.

SUMMARY OF THE INVENTION

The aim of the present invention is to eliminate the disadvantage above mentioned, and the invention is essentially characterized in that the ladle has such dimensions, that the lower part thereof will substantially cover the area of the furnace at the level where it is expected to cooperate with the same, and in that the bottom of the ladle is concave, rising from the perimeter towards the inlet.

DESCRIPTION OF THE PREFERRED EMBODIMENTS

Figure 1:
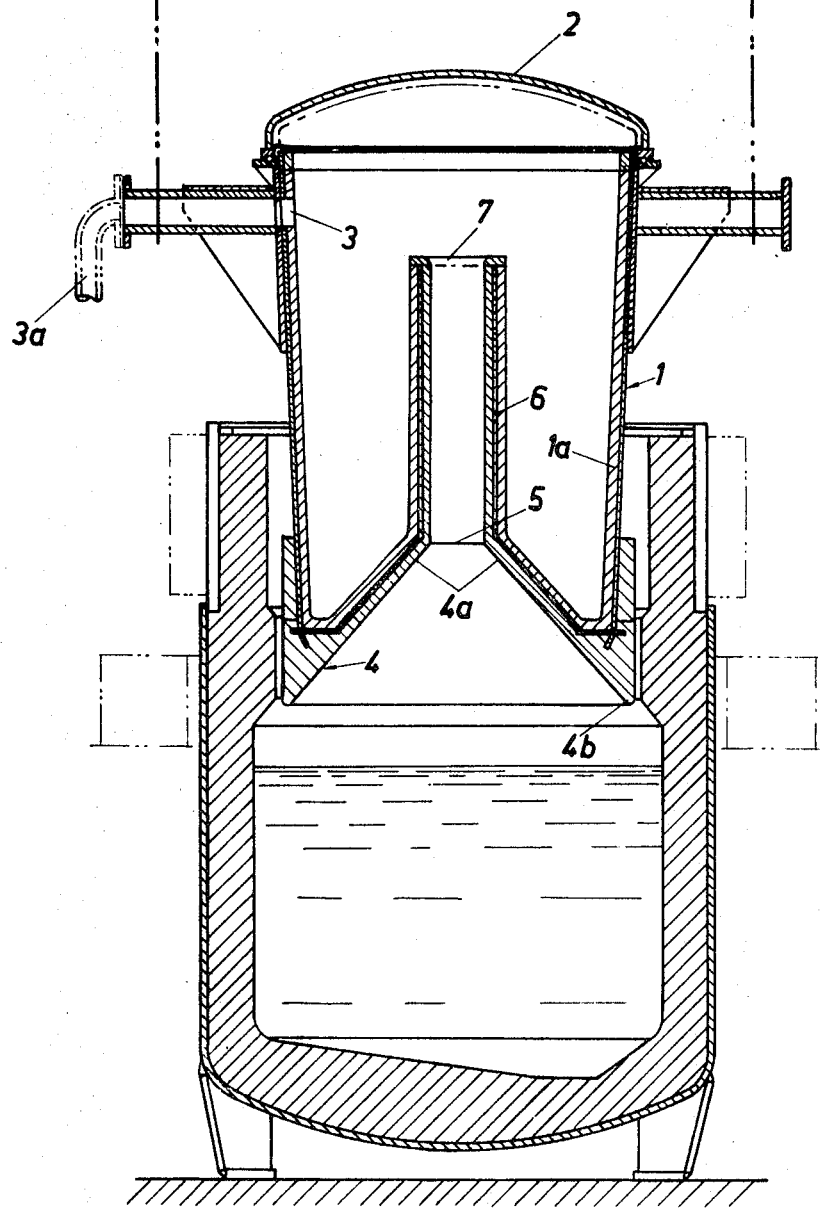
FIG. 1 shows a steel refinery furnace with a slag ladle mounted therein.
Figure 2:
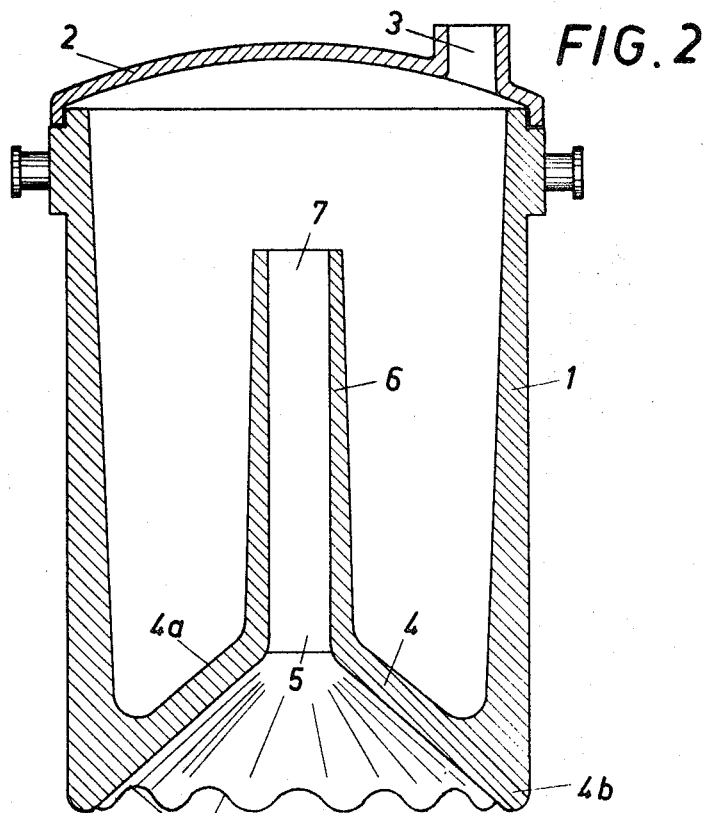
FIG. 2 shows a section through a slag ladle of the same general type as that according to FIG. 1.

The slag ladle according to FIG. 1 consists of a receptacle 1 having a suitable lining 1a and provided with a tightly fitting lid 2. An attachment 3 adapted to be connected to a conduit 3a from a slag-sucking apparatus (not shown) is fitted to the upper part of the receptacle, preferably at one of the brackets carrying the ladle during transportation. The bottom 4 of the receptacle is concave and has an upwardly and inwardly slanting surface 4a in the center of which an inlet 5 is provided. This inlet thus is located at a higher level than the perimeter 4b of the bottom 4. In the embodiment shown in FIG. 1 the inlet 5 is located at the lower end of a vertical riser pipe 6, the upper end 7 of which opens near the top of the ladle. The concave surface 4a is preferably shaped to conform to the envelop surface of a truncated cone or may be part spherical. The slag removal is brought about by the ladle being lowered into the furnace as shown in FIG. 1 in such a manner that the outer edge 4b will be submerged into the slag. The slag will then be forced towards the inlet 5 and will be withdrawn therethrough by means of the action of the vacuum pump. If the position of the slag ladle is adjusted in such a manner that the outer edge of the bottom will just reach the borderline between slag and steel bath, the slag along the wall of the furnace will also be sucked inwards. The embodiment according to FIG. 2 essentially corresponds to that of FIG. 1. The attachment 3 is, however, located in the lid 2 and the perimeter 4b of the bottom is provided with a series of notches 8 to form an undulated edge. This prevents an uneven slag sucking along the wall of the furnace if the ladle should not have an exactly vertical position.

Figure 3:
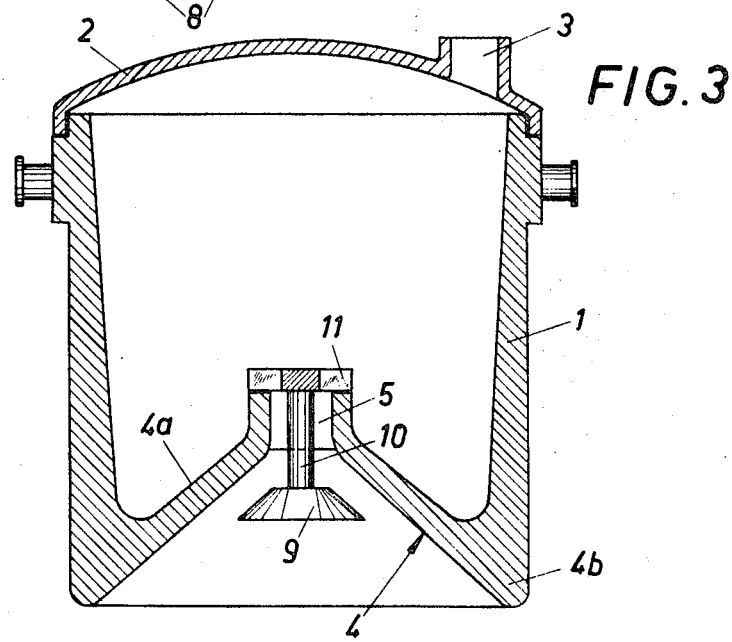
FIG. 3 shows a corresponding section through a further embodiment.

In the embodiment shown in FIG. 3 the opening 5 is designed as a seat cooperating with a valve member 9. This is provided with a shaft 10 and is carried by a cruciform body 11 or the like, which prevents the removal of the valve member and determines the opening position thereof. The total weight of the valve unit is so choosen that the valve will not float on the slag when the latter is forced towards the inlet 5. The valve 9 will, however, be lifted when the steel bath enters the concave bottom until it finally reaches the seat and closes the inlet. The closing is thus brought about by the difference in density of the slag and the steel, respectively, and will ensure that no melted steel will be sucked into the ladle. In this embodiment no riser pipe is required.

What I claim is:

1. In a slag ladle for a metallurgical furnace and of the type comprising a receptacle having a tightly fitting lid and a connection to a slag-sucking apparatus, as well as with a bottom having a centrally located inlet, the improvement of
   a lower part of the ladle having about the dimension required to cover the area of the furnace at the level where the ladle is expected to cooperate with the same, and
   a concave ladle bottom, rising from the perimeter of the ladle towards the inlet.

2. A slag ladle according to claim 1, in which the central inlet is located at the lower end of a vertical pipe fitted within the receptacle, the upper end of the pipe opening into the upper part of the ladle.

3. A slag ladle according to claim 1, in which the inlet is designed as a seat for cooperation with a valve member designed to sink through the slag but to float on the melted metal.

4. A slag ladle according to claim 1 in which the concave bottom has a surface corresponding to a truncated cone.

5. A slag ladle according to claim 1 in which the perimeter of the bottom of the receptacle is provided with a series of notches to form an undulating edge.